United States Patent
Chawla et al.

(10) Patent No.: US 12,035,723 B1
(45) Date of Patent: Jul. 16, 2024

(54) OAT FLOUR BASED FOOD COMPOSITION AND METHOD OF MANUFACTURE

(71) Applicant: Chobani LLC, Norwich, NY (US)

(72) Inventors: Amrish Chawla, Twin Falls, ID (US); Mingkai Cao, Twin Falls, ID (US); Jeff King, Twin Falls, ID (US); Amber King, Twin Falls, ID (US)

(73) Assignee: Chobani LLC, Norwich, NY (US)

( * ) Notice: Subject to any disclaimer, the term of this patent is extended or adjusted under 35 U.S.C. 154(b) by 645 days.

(21) Appl. No.: 16/935,666

(22) Filed: Jul. 22, 2020

(51) Int. Cl.
*A21D 2/38* (2006.01)

(52) U.S. Cl.
CPC ..................... *A21D 2/38* (2013.01)

(58) Field of Classification Search
CPC ....................................................... A21D 2/38
USPC ............................................................ 426/615
See application file for complete search history.

(56) References Cited

U.S. PATENT DOCUMENTS

| | | | |
|---|---|---|---|
| 6,190,708 B1 | 2/2001 | Triantafyllou |
| 6,287,612 B1 | 9/2001 | Mandava et al. |
| 6,451,369 B1 | 9/2002 | Triantafyllou |
| 6,592,914 B1 | 7/2003 | Triantafyllou |
| 6,685,974 B2 | 2/2004 | Whalen |
| 7,160,564 B2 | 1/2007 | Triantafyllou Oste et al. |
| 8,333,986 B2 | 12/2012 | Chen et al. |
| 8,337,880 B2 | 12/2012 | Chen et al. |
| 8,507,023 B2 | 8/2013 | Kuusisto et al. |
| 8,574,644 B2 | 11/2013 | Chatel et al. |
| 8,591,970 B2 | 11/2013 | Chatel et al. |
| 9,149,060 B2 | 10/2015 | Chatel et al. |
| 9,504,272 B2 | 11/2016 | Carder et al. |
| 9,510,614 B2 | 12/2016 | Carder et al. |
| 9,622,500 B2 | 4/2017 | Carder et al. |
| 9,743,684 B2 | 8/2017 | Triantafyllou |
| 10,092,016 B2 | 10/2018 | Avila et al. |
| 10,098,367 B2 | 10/2018 | Jacobsen et al. |
| 2004/0043123 A1 | 3/2004 | Triantafyllou Oste et al. |
| 2007/0059429 A1 | 3/2007 | Wild et al. |
| 2010/0028489 A1 | 2/2010 | Delgado Domingos Antunes Malcata et al. |
| 2011/0159145 A1 | 6/2011 | Alho-Lehto et al. |
| 2013/0330444 A1 | 12/2013 | Barbosa Senra Lopes et al. |
| 2015/0071891 A1 | 3/2015 | Delgado Domingos Antunes Malcata et al. |

(Continued)

FOREIGN PATENT DOCUMENTS

WO    WO-0030457 A1 * 6/2000  ............... A23L 2/52

*Primary Examiner* — Subbalakshmi Prakash
(74) *Attorney, Agent, or Firm* — Wood Herron & Evans LLP

(57) ABSTRACT

A method of making an oat composition is provided. The method includes adding oat flour to water. The method further includes adding a first enzyme to the oat-water mixture. The method further includes increasing the temperature of the oat-water mixture with the first enzyme, and maintaining the increased temperature of the oat-water mixture with the first enzyme. The method further includes cooling the oat-water mixture with the first enzyme. The method further includes adding an enzyme blend to the oat-water mixture with the first enzyme. The method further includes removing an amount of solids from the third enzyme oat-water mixture to form the oat composition. The method is able to achieve higher yields, increased shelf stability, and lower waste from manufacturing compared to conventional oat-based food composition manufacturing methods.

17 Claims, 2 Drawing Sheets

(56) References Cited

U.S. PATENT DOCUMENTS

| | | |
|---|---|---|
| 2016/0081375 A1 | 3/2016 | Chatel et al. |
| 2016/0198754 A1 | 7/2016 | Carder et al. |
| 2017/0105441 A1 | 4/2017 | Eisner et al. |
| 2018/0070602 A1 | 3/2018 | Moragne et al. |
| 2019/0000100 A1 | 1/2019 | McCormick |
| 2019/0000101 A1 | 1/2019 | Bilbao Calabuig et al. |
| 2019/0008176 A1 | 1/2019 | Bilbao Calabuig et al. |
| 2019/0021387 A1 | 1/2019 | Barata et al. |
| 2019/0045819 A1 | 2/2019 | Tategaki et al. |
| 2019/0045826 A1 | 2/2019 | Barata et al. |
| 2019/0110501 A1 | 4/2019 | Triantafyllou |
| 2019/0110508 A1 | 4/2019 | Bunce et al. |
| 2019/0191730 A1 | 6/2019 | Rascon |
| 2019/0216106 A1 | 7/2019 | Geistlinger et al. |
| 2020/0268022 A1 | 8/2020 | Norwood et al. |

* cited by examiner

OAT FLOUR BASED FOOD COMPOSITION AND METHOD OF MANUFACTURE

TECHNICAL FIELD

This disclosure relates to food products and methods and, in particular, to oat flour-based beverage and food products and methods of manufacturing oat flour based beverage and food products.

BACKGROUND

Oat-based beverage and food products are known to be nutritious, and may include oat milk therein. Oat milk may be used as a dairy substitute, and oat milk products have a benefit over conventional dairy products in that they avoid the use of lactose, which can be upsetting to consumers who are lactose intolerant. However, whole oat flour contains carbohydrates and fibers that are required to be broken down during processing to manufacture both low and high acid liquids or solid food formats.

Conventional oat-based food compositions cause high amounts of waste and have low yields. Additionally, due to the conventional methods used to breakdown carbohydrates in oats and oat flour, many conventional oat-based food compositions lack the ability to be stable for the long periods of time that they may be shelved or stored. Therefore, a need exists for newly or alternatively break down carbohydrates and fibers in whole oat flour for oat-based beverage and food product production to reduce waste, improve yields, and improve shelf stability.

SUMMARY

In one embodiment, a method of making an oat composition is provided. The method includes adding oat flour to water to form an oat-water mixture. The method further includes adding a first enzyme to the oat-water mixture at a temperature between 10° C. and 30° C., inclusively, to form a first enzyme oat-water mixture. The method further includes increasing the temperature of the first enzyme oat-water mixture to between 75° C. and 95° C., inclusively. The method further includes adding an additional amount of the first enzyme to the first enzyme oat-water mixture after increasing the temperature of the first enzyme oat-water mixture to between 75° C. and 95° C., inclusively, to form a second enzyme oat-water mixture. The method further includes maintaining, in a processing step, a temperature of the second enzyme oat-water mixture between 75° C. and 95° C., inclusively. The method further includes cooling the second enzyme oat-water mixture to a temperature between 45° C. and 70° C., inclusively. The method further includes adding an enzyme blend to the second enzyme oat-water mixture to form a third enzyme oat-water mixture. The method further includes maintaining a temperature of the third enzyme oat-water mixture between 45° C. and 70° C., inclusively. The method further includes removing an amount of solids from the third enzyme oat-water mixture to form the oat composition.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 3 illustrates a flowchart of an embodiment downstream process for a product that includes an oat-based beverage and food composition.

DETAILED DESCRIPTION

Figure 1:
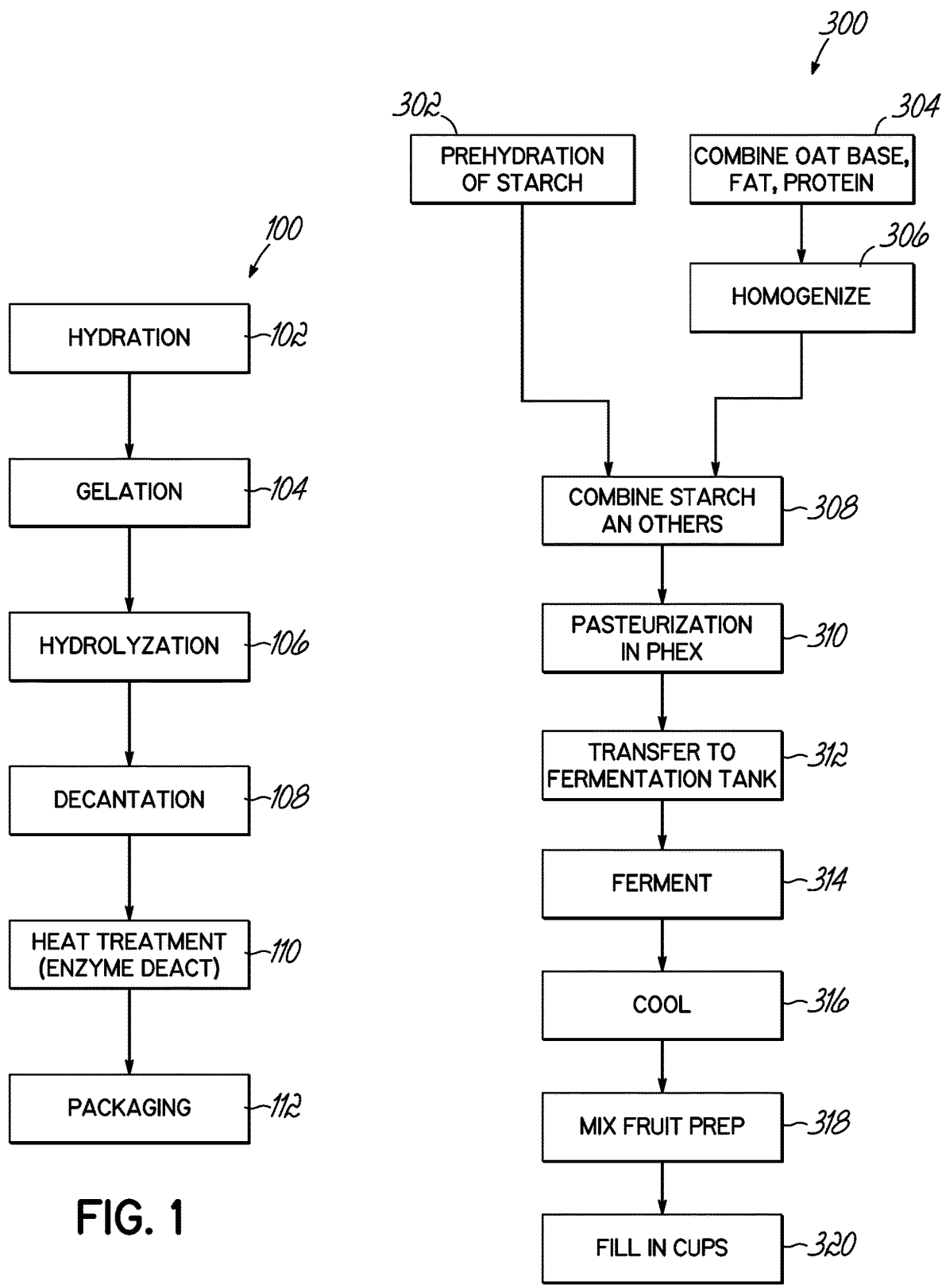
FIG. 1 illustrates a flowchart of an embodiment of a process overview of manufacturing an oat-based beverage and food composition.

By way of a broad overview, a method 100 of manufacturing an oat composition is described herein. FIG. 1 is a flowchart of an embodiment of a process overview of manufacturing an oat-based beverage and food composition. The method 100 includes hydrating, in a step 102, oat flour or whole oat flour with water to form an oat-water mixture, as well as adding a first enzyme to the oat-water mixture to form a first enzyme oat-water mixture. The method 100 further includes gelatinizing, in a step 104, the first enzyme oat-water mixture by increasing the temperature of the first enzyme oat-water mixture and adding an additional amount of the first enzyme to the first enzyme oat-water mixture to form a second enzyme oat-water mixture. The method 100 further includes hydrolyzing, in a step 106, the second enzyme oat-water mixture by reducing the temperature of the second enzyme oat-water mixture and adding an enzyme blend to the second enzyme oat-water mixture to form a third enzyme oat-water mixture. The method 100 further includes, in a step 108, decanting the third enzyme oat-water mixture to remove a fraction of insoluble solids of a particle size greater than or equal to 75 microns from the third enzyme oat-water mixture to form an oat composition. The method 100 further includes heating, in a step 110, the oat composition to deactivate the first enzyme and the enzyme blend still present in the oat composition. The method 100 may further include, in a step 112, packaging the oat composition in a container.

The methods and steps of FIG. 1 will now be described in more detail. In some embodiments, the oat-water mixture is formed in the step 102 by adding water to oat flour or whole-oat flour. The amount of water added to the oat flour or whole oat flour is between about 70 wt % and about 90 wt %, inclusively, of the oat-water mixture. The amount of oat flour or whole oat flour used in the step 102 is between about 10 wt % and about 30 wt %, inclusively, of the oat-water mixture. The oat flour may be whole oat flour. In some embodiments, the temperature of the oat-water mixture is between about 10° C. and about 30° C., inclusively. Preferably, the temperature of the oat-water mixture is between about 11° C. and about 29° C., inclusively.

The step 102 may further include adding a first enzyme to the oat-water mixture to form a first enzyme oat-water mixture. The first enzyme is added to the oat-water mixture when the oat-water mixture is at a temperature of between about 10° C. and about 30° C., inclusively. Preferably, the first enzyme is added to the oat-water mixture when the temperature of the oat-water mixture is between about 11° C. and about 29° C., inclusively. The first enzyme acts to reduce the viscosity of the oat-water mixture during subsequent steps. In this way, the first enzyme oat-water mixture has a lower viscosity than the oat-water mixture. In one embodiment, the first enzyme includes bacterial α-amylase, bacterial β-amylase, bacterial gluco amylase, fungal α-amylase, fungal β-amylase, fungal gluco amylase, or mixtures thereof.

The method 100 further includes a step 104 in which gelation of the first enzyme oat-water mixture occurs. The step 104 includes increasing the temperature of the first enzyme oat-water mixture to between about 50° C. and about 95° C. The step 104 further includes adding an additional amount of first enzyme to the first enzyme oat-water mixture to form a second enzyme oat-water mixture. In some embodiments, the additional amount of first enzyme may be added to the first enzyme oat-water mixture after the temperature increase of the first enzyme oat-water mixture. In some embodiments, the temperature of the second enzyme oat-water mixture is maintained between about 50° C. and about 95° C. for an amount of time, for example, between about 1 minute and about 30 minutes, inclusively. Maintaining the temperature between about 50° C. and about 95° C. for the amount of time encourages gelation of the oat-water first and second enzyme mixture.

The method 100 further includes a step 106 in which hydrolysis of the second enzyme oat-water mixture occurs. The temperature of the second enzyme oat-water mixture is reduced to between about 45° C. and about 65° C., inclusively. In addition, in step 106, an enzyme blend is added, in an amount between 0.025% and 3.5% by weight of the second enzyme oat-water mixture, to the second enzyme oat-water mixture to form a third enzyme oat-water mixture. The enzyme blend is added to the second enzyme oat-water mixture after the second enzyme oat-water mixture has had its temperature become between about 45° C. and about 65° C., inclusively. The enzymes added to the second enzyme oat-water mixture include enzymes that perform sensory functions as well as viscosity reduction and enzyme efficiency functions. In some embodiments, the enzymes included in the enzyme blend may include bacterial α-amylase, fungal α-amylase, bacterial β-amylase, fungal β-amylase, bacterial glucoamylase, fungal glucoamylase, bacterial glucose oxidase, fungal glucose oxidase, bacterial catalase, fungal catalase, bacterial cellulase, fungal cellulase, or mixtures thereof. The enzymes included in the enzyme blend help with breaking down starch and/or fiber into smaller units of carbohydrates and break the fibers into smaller units of fibers so as to convert the second enzyme oat-water mixture into a flowable liquid composition that can be then processed into a finished product. The enzymes included in the enzyme blend also help convert sugars into their respective acids or salts. In some embodiments, the bacterial α-amylase, fungal α-amylase, or mixture thereof, performs a viscosity reduction function as well as an enzyme efficiency function. In this way, the third enzyme oat-water mixture has a lower viscosity than the second enzyme oat-water mixture and smaller sub-units of starch and fiber. Alternatively, or in addition, the β-amylase and the glucoamylase have viscosity reduction function, a sensory function, or both, to improve taste, mouthfeel, and over all sensorial experience of the enzyme oat-water mixture. The addition of the enzymes individually or in combination helps in reducing the intrinsic grain flavor of the oat and converts the intrinsic grain flavor of the oat into a more aromatic and appeasing sweet cereal flavor desired for the enzyme oat water mixture. At step 106, the temperature of the third enzyme oat-water mixture is maintained at between about 45° C. and about 65° C., inclusively, to allow the enzyme blend in the third enzyme oat-water mixture to hydrolyze the third enzyme oat-water mixture. Hydrolyses at step 106 may last from about 60 minutes to about 120 minutes.

The method 100 further includes separating solids from the third enzyme oat-water mixture in a step 108. Separating of solids from the third enzyme oat-water mixture may occur by decantation, clarification, centrifugation, or other separation process. In step 108, solids are separated and removed from the third enzyme oat-water mixture to leaving an oat composition with particle size less than or equal to 75 microns. The solids removed from the third enzyme oat-water mixture may include insoluble fibers or other solids that may have formed during the previous steps. In some embodiments, the third enzyme oat-water mixture is centrifuged to clarify the solid particulate in the third enzyme oat-water mixture from the liquid. An amount of the solids included in the third enzyme oat-water mixture is removed at step 108, resulting in the oat composition. The third enzyme oat-water mixture has a solids content of between about 20 wt % and about 30 wt %, inclusively, prior to removal of the amount of solids content. Preferably, in some embodiments, the third enzyme oat-water mixture has a solids content of between about 23 wt % and about 28 wt %, inclusively, of the third enzyme oat-water mixture. The oat composition has a solids content between about 15 wt % and about 29 wt %, inclusively. Preferably, the oat composition has a solids content between about 19 wt % and about 25 wt %.

The method 100 further includes deactivating, in a step 110, the first enzyme and the enzyme blend in the oat composition. To deactivate the first enzyme and the enzyme blend, the oat composition is heated to between about 140° C. and 145° C., inclusively, and maintained at between 140° C. and 145° C., inclusively for between about 4 seconds and 9 seconds, inclusively.

In some embodiments, and as shown in FIG. 1, the method 100 may further include packaging, in a step 112, the oat composition after deactivation of the first enzyme and the enzyme blend with heat treatment in step 110. The oat composition may be packaged in cups having a volume of between 5.3 oz and 24 oz, inclusively, or other containers having a capacity of between, for example, 50 kg and 2000 kg, which may be suitable for carrying the oat composition.

Figure 2:
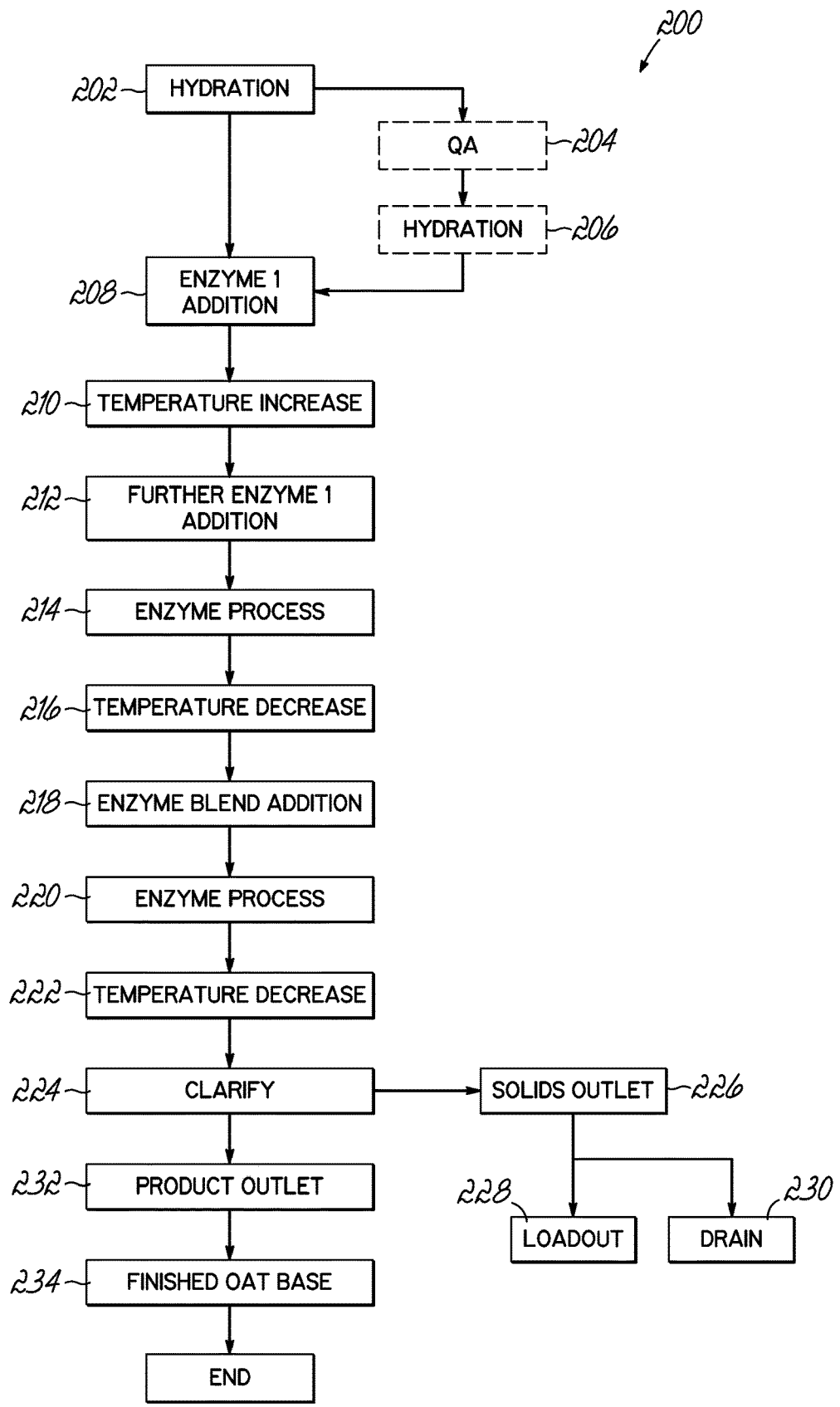
FIG. 2 illustrates a flowchart of another embodiment of a method of manufacturing an oat-based beverage and food composition.

By way of an overview of a more detailed process, a method 200 of manufacturing an oat composition is described herein. FIG. 2 illustrates a flowchart of an embodiment of a manufacturing method 200 for an oat-based food composition. The method 200 includes adding oat flour, whole oat flour containing the germ, bran, husk of oat, or mixtures thereof, to water to form an oat-water mixture at step 202. The method further includes, at step 208, adding a first enzyme between 0.02% and 3%, inclusively, by weight, to the oat-water mixture to form a first enzyme oat-water mixture. The method 200 further includes increasing, at step 210, the temperature of the first enzyme oat-water mixture and adding, at step 212, an additional amount of the first enzyme to the first enzyme oat-water mixture after the step 210 to form a second enzyme oat-water mixture. The method 200 further includes a step 214 which may include enzyme processing and include maintaining the temperature of the second enzyme oat-water mixture to allow for the first enzyme to further activate. The method 200 further includes cooling, at step 216, the second enzyme oat-water mixture. The method 200 further includes at step 218, adding an enzyme blend to the second enzyme oat-water mixture to form a third enzyme oat-water mixture, and an enzyme processing step 220, which may include maintaining a temperature of the third enzyme oat-water mixture to allow for the enzyme blend to process the third enzyme oat-water mixture. The method 200 further includes decreasing, at step 222, the temperature of the third enzyme oat-water mixture. The method 200 further includes clarifying, at step 224, the third enzyme oat-water mixture, which may include separating an amount of solids from the third enzyme oat-water mixture forming, at step 232, the oat composition. The amount of solids separated, at step 226, from the third enzyme oat-water mixture may be drained, at step 230, and discarded or reused in a loadout, at step 228. The oat composition, thus formed, at step 232, from having the amount of solids separated from the third enzyme oat-water mixture may then be finished further to form a finished oat base. The method 200 is able to yield between about 85 wt % and 90 wt % of the material used in the method 200. Such high yields are unusual in the industry. Alternatively or in addition, the method 200 is able to yield between about 85 wt % and 90 wt % of a sum of the weights of the water, oat flour or whole out flour, first enzyme, and enzyme blend used in the method 200. Further, oat-based food compositions prepared by method 200 have increased stability during storage and shelf-life of the oat-based food composition compared to conventional oat-based food compositions. In addition, the method 200 is able to produce less waste than conventional methods of manufacturing oat-based food compositions.

The method 200 for manufacturing the oat composition may be a batch method. Alternatively, the method 200 for manufacturing the oat-based food composition may be a continuous or semi-continuous method. In embodiments where a batch method is used, the batch size may be between about 1800 gallons and about 5400 gallons, inclusively (between about 6.8 kL and 20 kL, inclusively). In some embodiments, the batch size may be selected from a group consisting of about 1800 gallons, about 2400 gallons, about 4200 gallons, about 4800 gallons, and about 5400 gallons (selected from the group consisting of about 6.8 kL, about 9 kL, about 15.9 kL, about 18.2 kL, and about 20 kL). The batch process may use only a single tank or a plurality of connected tanks. Alternatively, the batch process may use a plurality or nonconnected tanks.

The method 200 and steps of FIG. 2 will now be described in further detail. In some embodiments, the oat-water mixture may be formed in a hydration step, at step 202, by adding water and oat flour or whole oat flour to a liquefier or tank. The method 200 includes, in the step 202, hydrating oat flour by adding oat flour to water, in a tank for example, to form an oat-water mixture. The oat flour may be whole oat flour. The water may be present in an amount between about 70 wt % and about 80 wt % of the oat-water mixture. The balance of the weight of the oat-water mixture is oat flour or whole oat flour. Alternatively or in addition, the oat flour or whole oat flour may be present in an amount between about 20 wt % to about 30 wt % in the oat-water mixture. In some embodiments, the oat-water mixture includes about 75 wt % of water and 25 wt % oat flour or whole oat flour. In some embodiments, the temperature of the oat-water mixture is between about 20° C. and about 30° C., inclusively. Preferably, the temperature of the oat-water mixture is between about 10° C. and about 25° C., inclusively. A step 204 may be a quality assurance step of the oat-water mixture, and may be conducted to assure that the pH and solids weight percentage of the oat-water mixture is within specification. For example, the step 204 may be a step to assure that the pH of the oat-water mixture is between 6.5 and 7.5, inclusively. Alternatively, or in addition, in another example, the step 204 may be a step in assure that the solids weight percentage of the oat-water mixture is between 24% and 29%, inclusively. In some embodiments, corrective measures, such as additional hydration at step 206, which may include adding additional water, oat flour, whole oat flour, or mixtures thereof, to the oat-water mixture to bring the pH and solids weight percentage of the oat-water mixture into specification may occur. Quality assurance at step 204 are not limited to occurring only after hydration at step 202, but is included here merely as a non-limiting example. Quality assurance measures at step 204 may occur after any or all of the steps included in the method 200, and may include a variety of correction steps, such as hydration at step 206. The corrective step is not limited to hydration at step 206, but may alternatively or in addition, in a non-limiting list, include separating solids, increasing or decreasing temperature, adding enzymes, adding oat flour, or allowing for additional time for enzyme activation. Each of these steps is accomplished while the oat-water enzyme mixture maintains a pH between 6.5 and 7.2, inclusively.

The method 200 further includes adding a first enzyme at step 208 to the oat-water mixture to form a first enzyme oat-water mixture. The first enzyme is added to the oat-water mixture when the oat-water mixture is at a temperature of between about 10° C. and about 30° C., inclusively. Alternatively, the first enzyme is added to the oat-water mixture when the temperature of the oat-water mixture is between about 10° C. and about 25° C., inclusively. The first enzyme acts to reduce the viscosity of the oat-water mixture during subsequent steps. In this way, the first enzyme oat-water mixture has a lower viscosity than the oat-water mixture. In one embodiment, the first enzyme includes bacterial α-amylase, fungal α-amylase, bacterial β-amylase, fungal β-amylase, bacterial glucose oxidase, fungal glucose oxidase, other peroxidases, or mixtures thereof.

The method 200 further includes increasing the temperature at step 210 of the first enzyme oat-water mixture. As mentioned above, the temperature of the first enzyme oat-water mixture may originally be between about 10° C. and about 30° C., inclusively. The temperature of the first enzyme oat-water mixture is increased at step 210 to be between about 70° C. and about 90° C., inclusively. In some embodiments, the temperature of the first enzyme oat-water mixture is increased to between about 75° C. and 85° C., inclusively.

The method 200 further includes adding an additional amount of the first enzyme at step 212 to the first enzyme oat-water mixture to form the second enzyme oat-water mixture. The additional amount of the first enzyme at step 212 is added after the temperature of the first enzyme oat-water mixture is increased in temperature at step 210, when the first enzyme oat-water mixture has a temperature of between about 70° C. and about 90° C., or preferably, when the first enzyme oat-water mixture has a temperature of between about 75° C. and about 85° C. At least because the temperature of the first enzyme oat-water mixture has already been increased, the additional amount of first enzyme added to the first enzyme oat-water mixture is activated soon after its addition and formation of the second enzyme oat-water mixture.

The method 200 further includes a processing step at step 214 to allow the first enzyme in the second enzyme oat-water mixture to activate and process the second enzyme oat-water mixture. The processing step at step 214 may last from about 1 minute to about 20 minutes. Preferably, the processing step at step 214 occurs for about 5 minutes to about 15 minutes. Even more preferably, the processing step at step 214 occurs for about 10 minutes. During the processing step at step 214, the temperature of the second enzyme oat-water mixture is maintained at between about 70° C. and about 90° C., inclusively. Alternatively, during the processing step at step 214, the temperature of the second enzyme oat-water mixture is maintained between about 75° C. and about 85° C., inclusively.

The method 200 further includes a temperature decreasing step at step 216. During the temperature decreasing step at step 216, the temperature of the second enzyme oat-water mixture is reduced to between about 50° C. and about 70° C., inclusively. The temperature decreasing step at step 216 is done in preparation of the addition of an enzyme blend into the second enzyme oat-water mixture.

The method 200 further includes adding an enzyme between 0.02%-3% by weight to the blend at step 218 to the second enzyme oat-water mixture to form a third enzyme oat-water mixture, and an enzyme processing step at step 220. The enzyme blend is added to the second enzyme oat-water mixture after the second enzyme oat-water mixture has had its temperature become between about 50° C. and about 70° C., inclusively. The enzymes added to the second enzyme oat-water mixture include enzymes that perform sensory functions as well as viscosity reduction and enzyme efficiency functions. In some embodiments, the enzymes included in the enzyme blend may include a bacterial α-amylase, a fungal α-amylase, a bacterial β-amylase, a fungal β-amylase, a bacterial glucoamylase, a fungal glucoamylase, a bacterial glucose oxidase, a fungal glucose oxidase, other peroxidase enzymes, or mixtures thereof. In some embodiments, the bacterial α-amylase, fungal α-amylase, bacterial β-amylase, or fungal β-amylase performs a viscosity reduction function as well as an enzyme efficiency function. In this way, the third enzyme oat-water mixture has a lower viscosity than the second enzyme oat-water mixture. Alternatively or in addition, the β-amylase and the glucoamylase have sensory functions and improve the mouthfeel of the oat-water enzyme blend. Individually and in combination, the enzymes added to the second enzyme oat-water mixture help improve taste, mouthfeel and over all sensorial experience of the enzyme oat-water mixture.

The method 200 further includes a processing step at step 220 to allow the enzyme blend in the third enzyme oat-water mixture to activate and process the third enzyme oat-water mixture. The processing step at step 220 may last from about 1 minute to about 60 minutes. Preferably, the processing step at step 220 occurs for about 20 minutes to about 50 minutes. Even more preferably, the processing step at step 220 occurs for about 45 minutes. During the processing step at step 220, the temperature of the third enzyme oat-water mixture is maintained at between about 50° C. and about 60° C., inclusively.

Optionally, method 200 further includes a temperature decreasing step at step 222. During the temperature decreasing step at step 222, the temperature of the third enzyme oat-water mixture is reduced to about between 40° C. and about 60° C., inclusively. Preferably, the temperature of the third enzyme oat-water mixture is reduced to between about 40° C. and about 50° C. Even more preferably, the temperature of the third enzyme oat-water mixture is adjusted to be about 47° C. The temperature decreasing step at step 222 is done to facilitate the separation of solids from the third enzyme oat-water mixture. The temperature decreasing step at step 222 is also done to reduce losses of solids that would occur during separation at higher temperatures.

The method 200 further includes a clarifying step at step 224. During the clarifying step, the third enzyme oat-water mixture is centrifuged to clarify the solid particulate in the third enzyme oat-water mixture from the liquid. An amount of the solids included in the third enzyme oat-water mixture is removed at step 226, either during the clarification step at step 224 or after the clarification step at step 224, resulting in the oat composition. The third enzyme oat-water mixture has a solids content of between about 20 wt % and about 30 wt %, inclusively, prior to removal of the amount of solids content. Preferably, in some embodiments, the third enzyme oat-water mixture has a solids content of between about 23.5 wt % and about 25 wt %, inclusively, of the third enzyme oat-water mixture. During the clarification step at step 224 or after the clarification step at step 224, an amount of solids from the third enzyme oat-water mixture is removed at step 226 from the third enzyme oat-water mixture resulting in the oat composition. The oat composition has a solids content between about 15 wt % and about 25 wt %, inclusively. Preferably, the oat composition has a solids content between about 20.5 wt % and about 22 wt %.

The solids removed from the third enzyme oat-water mixture may either be collected in a loadout step at step 228 or may be drained at step 230 from the system. The loadout step at step 228 may include collecting the solids removed from the third enzyme oat-water mixture may be used in a recycle step, sold, destroyed, or used in other processes. The solids removed from the third enzyme oat-water mixture may alternatively or in addition to the loadout step at step 228, be drained at step 230 from the system and discarded as waste.

The method 200 further includes a product outlet step at step 232. The product outlet step at step 232 includes the oat composition. As mentioned above, the oat composition has a solids content between about 15 wt % and about 25 wt %, inclusively. Preferably, the oat composition has a solids content between about 20.5 wt % and about 22 wt %. The method 200 is able to yield between about 85 wt % and 90 wt % of the material used in the method 200. Such high yields are unusual in the industry. Alternatively or in addition, the method 200 is able to yield between about 85 wt % and 90 wt % of a sum of the weights of the water, oat flour or whole out flour, first enzyme, and enzyme blend used in the method 200. These yields are able to be achieved from the unique blend of enzymes used in the manufacturing method 200 as well as the temperature and pH controls.

The method 200 further includes a finished oat base step at step 234. The finished oat base step at step 234 includes using the oat composition for either making oat beverages, making fermented cups, or selling the oat composition as a commodity.

At least because the oat-based food composition is oat-based and not milk-based, the carbohydrates included in the oat-based food composition may include glucose and maltose, but the oat-based food composition is substantially free of lactose. In addition, at least because the oat-based food composition has undergone the method of manufacture described in the preceding paragraphs, the oat-based food composition has an increased shelf stability compared to conventional oat-based food compositions.

The method 200 optionally includes a quality assurance step, at step 204, to check, for example, temperature, pH, and solids content levels, and corrective measures, at step 206, may be taken if these, or other, parameters are outside of specification to put these, or other, parameters back into specification. If the temperature, pH, solids content levels are not to specification within any portion of the process, the desired functionality of the oat base and finished products may be detrimentally affected.

In some embodiments, a portion of the oat composition may be used in a recycle step and fed into a new batch for manufacturing the oat composition.

A particular, non-limiting embodiment of the oat composition is now discussed. In the particular embodiment, the oat composition includes water at an amount between about 54 wt % and about 55 wt %. In the particular embodiment, the oat composition further includes the oat-water mixture, discussed above and produced in the hydration step 202, in an amount between about 21 wt % and about 23 wt %. In the particular embodiment, the oat composition further includes food starch in an amount between about 3.2 wt % and about 3.5 wt %. In the particular embodiment, the oat composition further includes vegetable fat in an amount between about 2.9 wt % and about 3.55 wt %. In the particular embodiment, the oat composition further includes vegetable protein in an amount between about 4.75 wt % and about 5.4 wt %. In the particular embodiment, the oat composition further includes natural flavor additives in an amount between about 0.05 wt % and about 0.15 wt %. In the particular embodiment, the oat composition further includes fruit in an amount between about 10 wt % and about 12 wt %. In the particular embodiment, the oat composition further includes hydrocolloids in an amount between about 0.35 wt % and about 0.39 wt %. In the particular embodiment, the oat composition further includes citric acid in an amount between about 0.05 wt % and about 0.71 wt %. All of these ranges are inclusive of the endpoints. Though the word "about" is used to identify the endpoints of these ranges, the precise endpoint values are also contemplated to be used.

Further, as described above, the oat composition may be used in an oat beverage. A particular embodiment of the oat beverage is now discussed. In the particular embodiment, the oat beverage includes water in an amount between about 64.5 wt % and about 66 wt %. The particular embodiment of the oat beverage further includes the oat-water mixture discussed above and produced in the hydration step 202, in an amount between about 31 wt % and about 33 wt %. The particular embodiment of the oat beverage further includes vegetable oil in an amount between about 1.69 wt % and about 1.96 wt %. The particular embodiment of the oat beverage further includes dipotassium phosphate in an amount between about 0.32 wt % and about 0.40 wt %. The particular embodiment of the oat beverage further includes calcium carbonate in an amount between about 0.24 wt % and about 0.32 wt %. The particular embodiment of the oat beverage further includes tricalcium phosphate in an amount between about 0.09 wt % and about 0.12 wt %. The particular embodiment of the oat beverage further includes hydrocolloid in an amount between about 0.03 wt % and about 0.04 wt %. The particular embodiment of the oat beverage further includes sea salt in an amount between about 0.1 wt % and about 0.12 wt %. The particular embodiment of the oat beverage further includes other vitamins and minerals in an amount between about 0.03 wt % and about 0.04 wt %.

FIG. 3 is a flowchart of an embodiment downstream process including a method 300 for manufacturing a product that includes an oat-based food composition. The method 300 includes pre-hydration of starch in a step 302. The method 300 further includes combining an oat base, fat, and protein in a step 304. The method 300 further includes homogenizing the oat base, fat, and protein in a step 306. The method 300 further includes, in a step 308, combining starch and the homogenized oat base, fat, and protein. The method 300 further includes pasteurizing, in a step 310, the homogenized oat base, fat, and protein combined with the starch. The method 300 further includes transferring the pasteurized, homogenized oat base, fat, and protein combined with the starch, in a step 312, to a fermentation tank. The method 300 further includes fermenting, in a step 314, the pasteurized, homogenized oat base, fat, and protein combined with the starch. The method 300 further includes, in a step 316, cooling the fermented, pasteurized, homogenized oat base, fat, and protein combined with the starch. In some embodiments, the method 300 further includes adding, in a step 318, an additive to the fermented, pasteurized, homogenized oat base, fat, and protein combined with the starch. The method 300 further includes filling, in a step 320, a container with the fermented, pasteurized, homogenized oat base, fat, and protein combined with the starch, along with, in some embodiments, the additive.

The method 300 includes the prehydration of starch at step 302. The prehydration of starch includes adding water to a starch. The starch may include starch from oat, wheat, tapioca, corn, or several of these, to form a water-starch mixture. The water-starch mixture may include water in an amount between about 70 wt % and 80 wt %. The water-starch mixture may further include the starch in an amount between about 20 wt % and about 30 wt %. The prehydration step at step 302 allows for the unfolding of the starch molecules so that the starch molecules are available for reaction with the enzyme. The prehydration step at step 302 also activates some of the natural enzymes that are present in the starch flour that function to modify the starch by, for example, reducing the long starch to shorter sub units. The water-starch mixture may be maintained at between 5° C. and 70° C., preferably about 60° C., for about 5 minutes to allow the starch to be properly hydrated.

The method 300 further includes, in a step 304, combining the oat composition with a fat composition and a protein. The fat composition may be present in an amount of 0.5% to 4%, inclusively, by weight of the combined oat base, fat composition, and protein, and may include canola, medium chain triglycerides, oil from coconut, oil from sunflower, algal oil, other plant-based oils, or combinations thereof. The protein may be present in an amount of between 0.5% and 7%, inclusively, by weight of the combined oat base, fat composition, and protein, and may include pea, sunflower, hemp, quinoa, soy, rice, white teff, oat, brown teff, canola, or combinations thereof. In step 304, the oat composition, which may be an oat composition as prepared in the previously described methods 100, 200, is combined with the fat composition and the protein at a temperature of between about 40° C. and 50° C. to form an oat-fat-protein mixture. In some examples, step 304 may include agitating the oat-fat-protein mixture to encourage sufficient mixing.

The method 300 further includes, in a step 306, homogenizing the oat-fat-protein mixture to form a homogenized oat-far-protein mixture. Homogenization in step 306 may occur at a pressure of between 1,400 psig and 4,500 psig, inclusively, and between about 40° C. and 50° C., inclusively to make a stable emulsion of the oat-fat-protein mixture.

The method 300 further includes, in a step 308, combining the water-starch mixture with the homogenized oat-fat-protein mixture to form a starch-oat mixture. In some examples, the water-starch mixture is combined with the homogenized oat-fat-protein mixture by blending them together to form a stable oil in water emulsion.

The method 300 further includes, in a step 310, pasteurizing the starch oat-mixture to form a pasteurized starch-oat mixture. During pasteurization, the starch-oat mixture is sterilized to reduce a risk of food poisoning. The pasteurization in the step 310, may occur at a temperature of between about 77° C. and 97° C., inclusively, for a duration, which may be between about 3 seconds and 10 minutes. After the duration, the pasteurized starch-oat mixture is cooled to about 37.8° C. in a plate heat exchanger.

The method 300 further includes, in a step 312, transferring the pasteurized starch-oat mixture to a fermentation tank with the use of centrifugal pumps in less than 90 minutes.

The method 300 further includes, in a step 314, fermenting the pasteurized starch-oat mixture in the fermentation tank to form a fermented starch-oat mixture. During step 314, fermentation of the pasteurized starch-oat mixture occurs During fermentation of portions of the pasteurized starch-oat are fermented by lactic acid bacteria that convert the sugars in the mixture into organic acids and the protein in the mixture into smaller peptides. The fermentation process occurs at a temperature of about 37.8° C. and occurs over a duration, which may be between about 5 hours and about 8 hours, inclusively.

The method 300 further includes, in a step 316, cooling the fermented starch-oat mixture. In step 316, the fermented starch-oat mixture is cooled to between about 18° C. and 21.1° C., inclusively.

The method 300 further includes, in a step 318, adding an additive to the starch-oat mixture to form an oat-based food product. The additive may include fruit, artificial or natural flavoring, food coloring dyes, salt, sea salt, vitamins, minerals, oils such as vegetable oil, fats such as vegetable fats, protein such as vegetable protein, calcium carbonate, citric acid, hydrocolloids, dipotassium phosphate, tricalcium phosphate, or other additives. In embodiments where fruit is added, the fruit may be mixed, blended, or otherwise incorporated into the fermented starch-oat mixture. In an embodiment where fruit is added, the fruit may be about 10 wt % of the fermented starch-oat mixture.

The method 300 may further include, in a step 320 and as shown in FIG. 3, packaging the oat-based food product. The oat-based food product may be packaged in step 320 in cups or other containers suitable for carrying the oat composition. The cups may have a volume of about 5.3 oz. The oat-based food product may also be packaged in an array of different size containers including up to 52 oz.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. All of the ranges of parameters described herein are inclusive of the endpoints. Though the word "about" is used to identify the endpoints of parameter ranges, the precise endpoint values are also contemplated to be used.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method of making an oat composition, the method comprising:
adding oat flour to water to form an oat-water mixture;
adding a first enzyme to the oat-water mixture at a temperature between 20° C. and 30° C., inclusively, to form a first enzyme oat-water mixture;
increasing the temperature of the first enzyme oat-water mixture to between 80° C. and 95° C., inclusively;
adding an additional amount of the first enzyme to the first enzyme oat-water mixture after increasing the temperature of the first enzyme oat-water mixture to between 80° C. and 85° C., inclusively, to form a second enzyme oat-water mixture;
maintaining, in a processing step, a temperature of the second enzyme oat-water mixture between 80° C. and 85° C., inclusively;
cooling the second enzyme oat-water mixture to a temperature between 50° C. and 60° C., inclusively;
adding an enzyme blend to the second enzyme oat-water mixture to form a third enzyme oat-water mixture;
maintaining a temperature of the third enzyme oat-water mixture between 50° C. and 60° C., inclusively; and
removing an amount of solids from the third enzyme oat-water mixture to form the oat composition; and
deactivating the first enzyme and the enzyme blend in the oat composition.

2. The method of claim 1, wherein the method is a batch process.

3. The method of claim 1, wherein the oat composition comprises between about 18 wt % and about 24 wt % solids.

4. The method of claim 1, wherein the third enzyme oat-water mixture comprises:
between about 22 wt % and about 26 wt % solids.

5. The method of claim 1, further comprising:
circulating the oat-water mixture while adding additional oat flour to the oat-water mixture.

6. The method of claim 1, further comprising:
deactivating the first enzyme, the second enzyme, and the enzyme blend.

7. The method of claim 6, wherein deactivating the first enzyme, the second enzyme, and the enzyme blend is accomplished by raising the temperature of the oat composition to at least about 140° C.

8. The method of claim 1, wherein the first enzyme comprises bacterial α-amylase.

9. The method of claim 1, wherein the enzyme blend comprises:
fungal α-amylase;
glucoamylase; and
β-amylase.

10. The method of claim 1, wherein the oat-water mixture has a temperature of between 20° C. and 30° C., inclusively, during adding the oat flour to water to form the oat-water mixture.

11. The method of claim 1, further comprising:
collecting an amount of solids removed from the third enzyme oat-water mixture.

12. The method of claim 1, further comprising:
cooling the third enzyme oat-water mixture to between about 50° C. and about 60° C. to facilitate the separation of solids from the third enzyme oat-water mixture.

13. The method of claim 1, wherein the method yields between about 85 wt % and 90 wt % of a total sum of weights of the water, oat flour, first enzyme, and enzyme blend used in the method.

14. The method of claim 1, wherein maintaining, in a processing step, the temperature of the second enzyme oat-water mixture between 80° C. and 85° C., inclusively, occurs for about 1 minute to about 20 minutes.

15. The method of claim 1, wherein maintaining, in a processing step, the temperature of the third enzyme oat-water mixture between 50° C. and 60° C., occurs for about 20 minutes to about 50 minutes, inclusively.

16. A method for making an oat-based food product, comprising:
hydrating a starch to form a water-starch mixture;
homogenizing an oat base, a fat composition, and a protein to form a homogenized oat-fat-protein mixture;
combining the oat-fat-protein mixture with the water-starch to form a starch-oat mixture;
pasteurizing the starch-oat mixture to form a pasteurized starch-oat mixture;
fermenting the pasteurized starch-oat mixture to form a fermented starch-oat mixture;
adding an additive to the fermented starch-oat mixture to form the oat-based food product.

17. A method of making an oat composition, the method comprising:
hydrating oat flour or whole oat flour with water to form an oat-water mixture, and adding a first enzyme to the oat-water mixture to form a first enzyme oat-water mixture, wherein the first enzyme comprises bacterial α-amylase;
hydrolyzing the first enzyme oat-water mixture by increasing the temperature of the first enzyme oat-water mixture and adding an additional amount of the first enzyme to the first enzyme oat-water mixture to form a second enzyme oat-water mixture;
hydrolyzing the second enzyme oat-water mixture by reducing the temperature of the second enzyme oat-water mixture and adding an enzyme blend to the second enzyme oat-water mixture to form a third enzyme oat-water mixture, wherein the enzyme blend comprises: fungal α-amylase; glucoamylase; and β-amylase;
decanting the third enzyme oat-water mixture to remove insoluble solids from the third enzyme oat-water mixture to form an oat composition; and
heating the oat composition to deactivate the first enzyme and the enzyme blend still present in the oat composition.

\* \* \* \* \*